US010072874B2

(12) United States Patent
McDonald et al.

(10) Patent No.: US 10,072,874 B2
(45) Date of Patent: Sep. 11, 2018

(54) SYSTEM AND METHOD FOR ADAPTIVELY CONTROLLING THE CHARGING TIME OF A STORAGE HEATER

(71) Applicant: Basic Holdings, Cloghran, Co. Dublin (IE)

(72) Inventors: Alan McDonald, Craigavon (GB); Damian Shields, Craigavon (GB)

(73) Assignee: Basic Holdings, Cloghran, Co. Dublin (IE)

( * ) Notice: Subject to any disclaimer, the term of this patent is extended or adjusted under 35 U.S.C. 154(b) by 0 days.

(21) Appl. No.: 15/312,825

(22) PCT Filed: May 26, 2015

(86) PCT No.: PCT/EP2015/061535
§ 371 (c)(1),
(2) Date: Nov. 21, 2016

(87) PCT Pub. No.: WO2015/181136
PCT Pub. Date: Dec. 3, 2015

(65) Prior Publication Data
US 2017/0130992 A1   May 11, 2017

(30) Foreign Application Priority Data
May 27, 2014 (GB) .................................. 1409352.0

(51) Int. Cl.
*F24H 9/20* (2006.01)
*F24H 7/02* (2006.01)
*F24H 7/06* (2006.01)

(52) U.S. Cl.
CPC ......... *F24H 9/2078* (2013.01); *F24H 7/0216* (2013.01); *F24H 7/062* (2013.01)

(58) Field of Classification Search
CPC ...... F24H 9/2078; F24H 7/002; F24H 7/0216; F24H 7/062; F24D 15/02; F24D 19/10; G05D 23/1923

(Continued)

(56) References Cited

U.S. PATENT DOCUMENTS

| 5,700,993 | A | * | 12/1997 | Counsell | ............ | G05D 23/1923 |
|           |   |   |         |          |              | 219/483 |
| 2011/0178670 | A1 | * | 7/2011 | Perkins | .................. | B60K 35/00 |
|              |    |   |        |         |                    | 701/31.4 |

(Continued)

FOREIGN PATENT DOCUMENTS

| DE | 1922067 A1 | 11/1970 | ............ G05D 23/24 |
| GB | 2105873 A | 3/1983 | ............... F24H 7/00 |

(Continued)

OTHER PUBLICATIONS

International Search Report and Written Opinion from corresponding International Patent Application No. PCT/EP2015/061535, dated Jul. 24, 2015.

(Continued)

Primary Examiner — Dana Ross
Assistant Examiner — Joe E Mills, Jr.
(74) Attorney, Agent, or Firm — Kusner & Jaffe

(57) ABSTRACT

Provided is a method for adaptively controlling the charging time of a storage heater, comprising: determining a stored energy requirement of the heater; determining a background heat requirement of the heater; determining a daily energy requirement (DER) based on the stored energy requirement and the background heat requirement; and determining a daily run time (DRT) at a predetermined time to calculate the charging time for a following period of time based on the daily energy requirement (DER).

16 Claims, 6 Drawing Sheets

(58) Field of Classification Search
USPC ................................. 392/345; 219/494, 506
See application file for complete search history.

(56) References Cited

U.S. PATENT DOCUMENTS

| | | | | |
|---|---|---|---|---|
| 2011/0282499 A1* | 11/2011 | Sowani | ................ | F24H 9/2078 |
| | | | | 700/282 |
| 2012/0125559 A1* | 5/2012 | Fadell | ................ | F24F 11/0012 |
| | | | | 165/11.2 |
| 2012/0296479 A1* | 11/2012 | Millar | ................ | G05D 23/1923 |
| | | | | 700/277 |
| 2013/0146587 A1* | 6/2013 | McDonald | ......... | G05D 23/1923 |
| | | | | 219/494 |
| 2013/0200168 A1* | 8/2013 | Buescher | ............. | F24H 9/2021 |
| | | | | 237/8 A |
| 2014/0163743 A1* | 6/2014 | Kitajima | ............ | G05D 23/1923 |
| | | | | 700/276 |
| 2014/0321839 A1* | 10/2014 | Armstrong | ............ | F24H 9/2021 |
| | | | | 392/463 |
| 2015/0055941 A1* | 2/2015 | McDonald | ......... | G05D 23/1923 |
| | | | | 392/344 |

FOREIGN PATENT DOCUMENTS

| | | | | |
|---|---|---|---|---|
| GB | 2384300 A | | 7/2003 | ............... F24H 7/00 |
| GB | 2428782 A | * | 2/2007 | ........... F24H 9/2078 |
| WO | WO 2011/154521 A2 | | 12/2011 | ................ H02J 3/28 |

OTHER PUBLICATIONS

Combined Search and Examination Report from corresponding United Kingdom Patent Application No. GB1409352.0, dated Nov. 17, 2014.

* cited by examiner

| Seasonal Band | Ext. temp. | 17 | 18 | 19 | 20 | 21 | 22 | 23 | 24 | 25 |
|---|---|---|---|---|---|---|---|---|---|---|
| 1 | -3 | 570 | 624 | 678 | 732 | 786 | 840 | 894 | 984 | 1002 |
| 2 | -1 | 510 | 564 | 618 | 672 | 726 | 780 | 834 | 888 | 942 |
| 3 | 0 | 481 | 535 | 589 | 643 | 697 | 751 | 805 | 859 | 913 |
| 4 | 1 | 451 | 505 | 559 | 613 | 667 | 721 | 775 | 829 | 883 |
| 5 | 5 | 332 | 386 | 440 | 494 | 548 | 602 | 656 | 710 | 764 |
| 6 | 8 | 243 | 297 | 351 | 405 | 459 | 513 | 567 | 621 | 675 |
| 7 | 12 | 124 | 178 | 232 | 286 | 340 | 394 | 448 | 502 | 556 |

QM100

| Seasonal Band | Ext. temp. | 17 | 18 | 19 | 20 | 21 | 22 | 23 | 24 | 25 |
|---|---|---|---|---|---|---|---|---|---|---|
| 1 | -3 | 778 | 854 | 931 | 1007 | 1083 | 1159 | 1236 | 1312 | 1388 |
| 2 | -1 | 697 | 773 | 849 | 926 | 1002 | 1078 | 1154 | 1230 | 1307 |
| 3 | 0 | 656 | 732 | 809 | 885 | 961 | 1037 | 1114 | 1190 | 1266 |
| 4 | 1 | 615 | 692 | 768 | 844 | 920 | 997 | 1073 | 1149 | 1225 |
| 5 | 5 | 453 | 529 | 605 | 681 | 758 | 834 | 910 | 986 | 1063 |
| 6 | 8 | 331 | 407 | 483 | 559 | 636 | 712 | 788 | 864 | 941 |
| 7 | 12 | 168 | 244 | 320 | 397 | 473 | 549 | 625 | 702 | 778 |

Figure 4

| Maximum Rate of change of room temperature (deg C / hour) | Seasonal Band | Months |
|---|---|---|
| 0 | 7 | May, June, July, Aug |
| -0.25 | 6 | April, Sept |
| -0.5 | 5 | Mar, Oct |
| -0.75 | 4 | Nov |
| -1 | 3 | Dec |
| -1.25 | 2 | Jan |
| -1.5 | 1 | Feb |

Figure 5

| Difference between the setpoint and the actual room temperature at 00:00 (Setpoint minus actual room temperature) | Adjust seasonal band |
|---|---|
| >=3 | -3 |
| 2.9<   <=2 | -2 |
| 1.9<   <=1 | -1 |
| 0.9<   >=-1 | 0 |
| -1 | 0 |
| 1 | 0 |
| 20.1<   <=21 degC | 1 |
| 21.1<   <=22 degC | 2 |

Figure 6

|  |  | Actual standing loss (W) - function of SB | | | | | | |
|---|---|---|---|---|---|---|---|---|
|  |  | Seasonal band | | | | | | |
| Heater model | Maximum standing loss (W) | 1 | 2 | 3 | 4 | 5 | 6 | 7 |
| QM100 | 200 | 200 | 125 | 83.33 | 62.5 | 50 | 41.67 | 0 |
| QM125 | 375 | 375 | 250 | 166.67 | 125 | 100 | 83.33 | 0 |
| QM150 | 450 | 450 | 300 | 200 | 150 | 120 | 100 | 0 |

Figure 7

| Core sensor temp | Brick temp | Residual energy KW |
|---|---|---|
| 50 | 159.009 | 1.461641128 |
| 65 | 206.391 | 2.635283792 |
| 120 | 380.125 | 6.938640225 |
| 150 | 474.889 | 9.285925552 |
| 190 | 601.241 | 12.41563932 |
| 200 | 632.829 | 13.19806776 |

Figure 8

SYSTEM AND METHOD FOR ADAPTIVELY CONTROLLING THE CHARGING TIME OF A STORAGE HEATER

FIELD OF THE INVENTION

The present application relates to storage heaters and in particular to determining the charging requirements of a storage heater.

BACKGROUND OF THE INVENTION

Storage heaters are well known as a source of electric heating. Traditionally they have operated under the principle that energy can be provided to the heater during specific periods of the day, and that supplied energy can be released from the heater during different time periods. FIG. 1 illustrates an example of a storage heater 100. As shown in the example of FIG. 1, the storage heater 100 comprise a heatable material 120 in the form of bricks or other materials such as ceramic which is located within a housing 100 of the storage heater 100. The heatable material 120 is then heated using an electric element 110 so as to increase the temperature of the heatable material. This stored heat is then released continuously through a process of both thermal radiation and convection. The speed of heat transfer may be increased through use of a damper and/or in conjunction with mechanical fans. The storage heater 100 is designed to release heat and typically has no more than 20% heat retention. It will be appreciated that industry standards define a storage heater as having such a heat retention rate.

Traditionally the use of storage heaters is prevalent in areas where the electricity network operator provides a two-tariff electricity meter. This allows the heating of the storage heater to be effected during periods of low cost electricity—such as during the night when the overall load on the network is less than peak times. The heating of the storage heater during this off peak period has to be sufficient to allow the heater to provide continuous heating to the area within which it is located during the intervals between heating. Typically these intervals can be as much as 12 hours. In a typical known mode of operation the heat output from the storage heater adopts a curve such as that shown in FIG. 2, which does not match the user demand for heat. As the heat is output from the storage heater in a continuous process, it has one peak output—shown in the example of FIG. 2 as occurring about 0900 in the morning. After that, its capacity to provide heat reduces with the result that when the user requires additional heat later in the day, the heater does not necessarily have the capacity to provide that heat.

To compensate for this discrepancy many heater manufacturers provide additional capacity for storing heat in their heaters. In this way the potential output of the storage heater is designed to be greater than that actually required. This is typically achieved by heating the storage materials to temperatures of the order of 700° C. While this allows for additional heating capacity later in the evening, it does not change the output curve, with the result that there is also additional heat provided in the early parts of the day. This can result in excessive heat being provided to that required. This can result in excessive heating of the room and a waste of heat.

It will be understood that there is a direct relationship between the energy input and the heat output of a conventional storage heater, which means the user has very limited control of heat output, typically no more than 15% of the total heat output. This makes the heater relatively unresponsive to changing weather conditions and user needs.

Many of these problems are discussed in GB2384300 of which the present inventor is the named inventor. This patent describes how operation of a traditional storage heater may be supplemented by a secondary heat source such as a radiant element which can be utilised to supplement the output of the main heat source—the storage material.

SUMMARY OF THE INVENTION

The present teaching provides a method of determining the charging time required of a storage heater based on an adaptive control algorithm using historic data. Accordingly, a first embodiment of the application provides a method as detailed in claim 1. Advantageous embodiments are provided in the dependent claims.

BRIEF DESCRIPTION OF THE DRAWINGS

The present application will now be described with reference to the accompanying drawings in which:

FIG. 4 is a lookup table used to obtain a heating demand;

FIG. 5 is a lookup table used to calculate a seasonal band;

FIG. 6 is a lookup table used to calculate a seasonal band adjustment;

FIG. 7 is a lookup table used to calculate actual standing loss;

FIG. 8 is a lookup table showing the relationship between core sensor temperature, brick temperature, and residual energy;

DETAILED DESCRIPTION OF THE INVENTION

Figure 1:
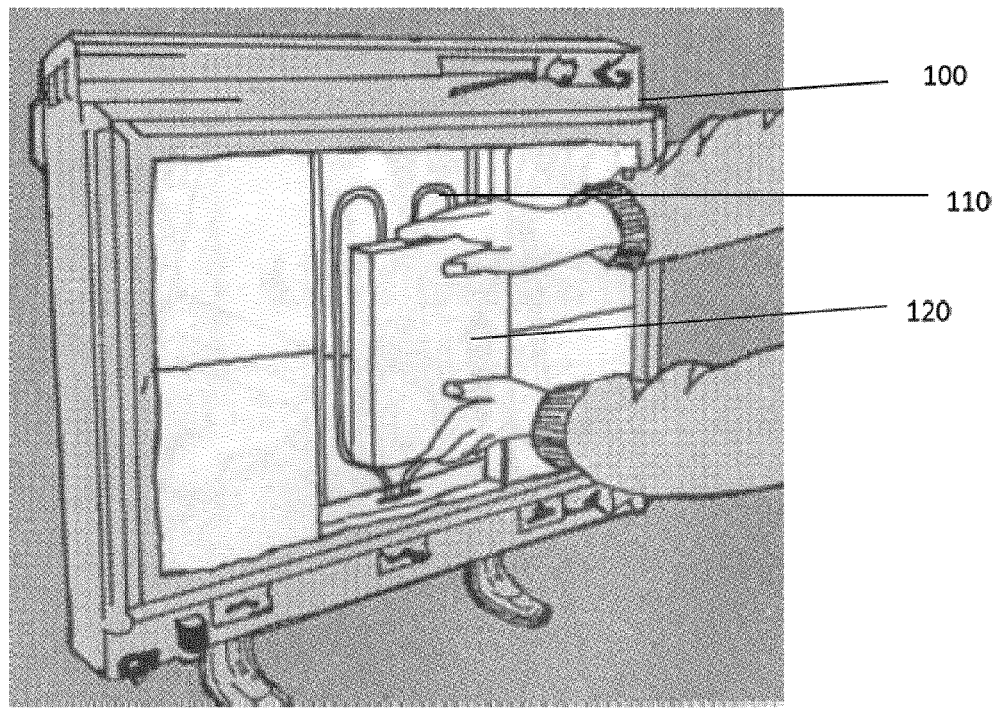
FIG. 1 illustrates an example of a storage heater.
Figure 2:
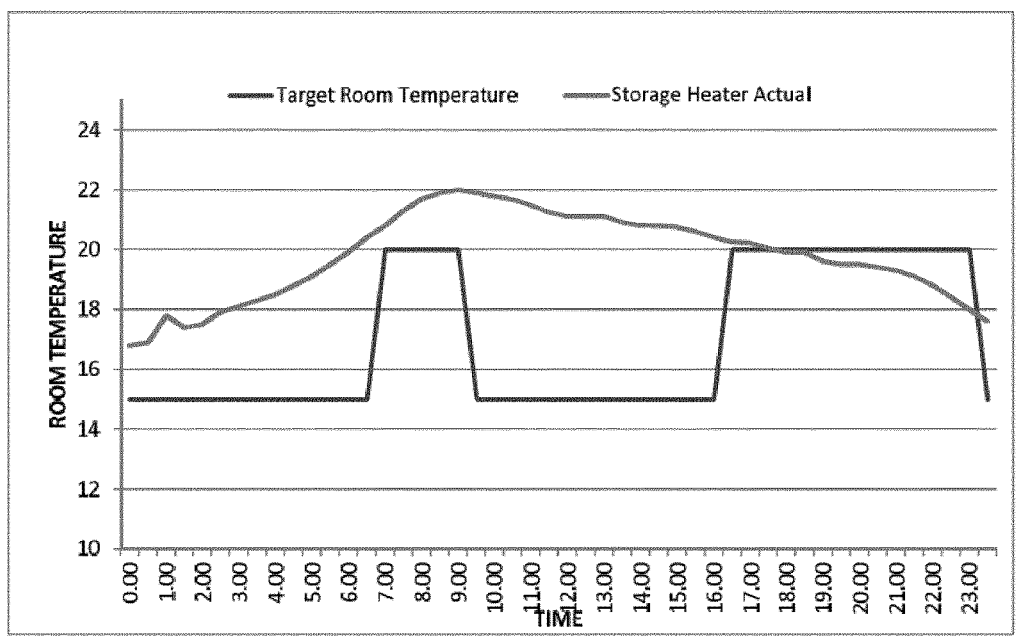
FIG. 2 is a graph of room temperature versus time for a storage heater.

The present teaching provides a method for adaptively controlling the charging time of a storage heater according to certain parameters related to the energy requirements of a room or internal space in which the storage heater is located.

Storage heaters usually have two controls—a charge control (often called "input"), which controls the amount of heat stored, and the draught control (often called "output"), which controls the rate at which heat is released. These controls may be controlled by the user, or may operate automatically once the user selects the target room temperature on a thermostat. Such a storage heater as described above may be equipped with a display panel for displaying various characteristics of the storage heater such as the input and output settings.

In accordance with the present teaching a controller is provided and is configured to dynamically modify the heat take up and output of the storage heater. The controller may monitor one or more of: historical data, rate of heat loss of the room, thermal characteristics of the room and actual operating usage of the device to determine the future powering requirements of the heater. This provides a dynamic core temperature device to provide optimum energy storage and minimise the maximum operating core temperature. This minimises static losses during non-heating periods and the overall energy consumption.

In one configuration the controller is configured to allow a user to select a desired temperature within a prescribed time for the room in which the device is being used. The device will provide an output based on those selected parameters. By monitoring how the device has coped with the actual usage, the device may dynamically modify its powering requirements to ensure this usage pattern is facilitated.

The present teaching is concerned with the charge control of a storage heater. The present inventors have realised that the charging of a storage heater may be adaptively controlled according to factors such as the outside temperature, the standing loss of the heater, and the residual energy remaining in the storage heater at a certain time of the day. Within the general term adaptive control it will therefore be appreciated that one or more of the following principles could be used to compute an appropriate charge control regime for a heater:

Adaption based on actual heater performance;
Adaption based on fan run time;
Adaption based on boost element usage;
Adaption based on heating requirements;
Off Peak supply profile;
Residual Energy.

It will be appreciated that the specifics of any one of the adaptive regimes may vary and for the ease of understanding an exemplary methodology will now be described with reference to an adaption based on actual heater performance.

In such an implementation a method for adaptively controlling the charge time of a storage heater in a room or space according to the present teaching is described as follows. The method in the form of a charge control algorithm may be run daily at a predetermined time each day in order to calculate the following day's heating requirements. For example, the method may be performed at night-time, for example at 00:00. The time at which the method is performed allows the storage heater to be charged in advance of the following day and according to historical data.

The method comprises at least the following steps: determining a stored energy requirement of the heater; determining a background heat requirement of the heater; determining a daily energy requirement (DER) based on the stored energy requirement and the background heat requirement; and determining a daily run time (DRT) at a predetermined time to calculate the charging time for a following period of time based on the daily energy requirement (DER). It will be understood in the context of the present teaching that the daily run time (DRT) refers to the charging time of the storage heater. The steps are desirably performed in advance of each heating cycle.

Figure 3:
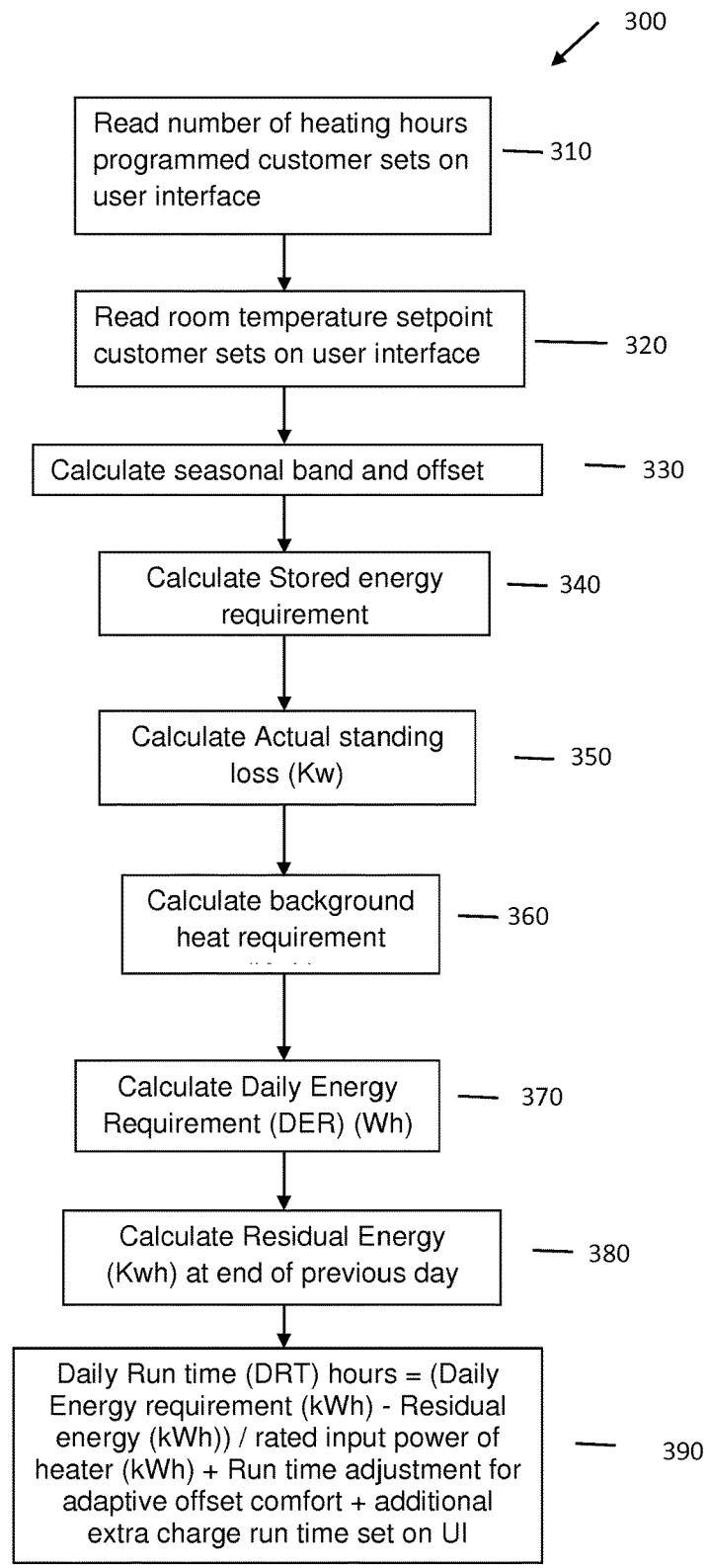
FIG. 3 is a flowchart illustrating an example of a charge control algorithm according to an embodiment of the present teaching.

FIG. 3 is a flowchart illustrating an example of a charge control methodology 300 according to an embodiment of the present teaching. Referring to FIG. 3, a method 300 in accordance with the present teaching comprises reading from memory of the storage heater the number of heating hours programmed for the heater. These will typically be user configurable via a user interface provided on the storage heater 310 and is input to the memory where it is read by a computer program component of the controller when executing on a processor of the storage heater. This number of heating hours will affect the required heating capacity for the heater for the next heating period. In addition to this parameter the method takes as an input a room temperature setpoint 320, which again can be user configurable via the user interface. Based on the time of year the method also provides for a calculation of a seasonal band and offset 330. The use of this parameter is based on an understanding that different seasons have different heating requirements and this can have a bearing on the performance requirements of the heater. The previous listed parameters relate to expected heating requirements for the future heating period.

In addition to using a forecasting of the expected heating requirement, a method provided in accordance with the present teaching also makes use of historical data. In one aspect this takes a number of parameters reflecting the actual conditions of the heater at this point in time. This may include one or more of calculating a stored energy requirement 340, calculating an actual standing loss (Kw) 350.

Using these forecast and actual conditions the method may then perform a number of calculations including calculating a background heat requirement (kWh) 360, calculating a Daily Energy Requirement (DER) (kWh) 370, calculating a Residual Energy (kWh) at the end of the previous day 380, and calculating a Daily Run time (DRT) hours parameter. This DRT hours parameter can be computed from the relationship (Daily Energy requirement (kWh)−Residual energy (kWh))/rated input power of heater (kw)+Run time adjustment for adaptive offset comfort+ additional extra charge run time set on UI 390.

The stored energy requirement is a function of the number of programmed heating hours and the heating demand per hour. Accordingly, the stored energy requirement may be calculated by multiplying the number of programmed heating hours by the heating demand. The number of programmed heating hours may be set on a user interface of the storage heater. The number of programmed heating hours may be based on the amount of time the user intends to spend in the room or space in which the storage heater is located. As mentioned above a room temperature setpoint that the user sets on the user interface is also read. The room temperature setpoint is typically between 17 and 25° C. The heating demand per hour may be obtained from a lookup table based on the storage heater model reference, seasonal band, external temperature and the room temperature setpoint. An example of such a lookup table is illustrated in FIG. 4. Each heater model may have a different lookup table. The heater storage heater model reference may be selected from a plurality of models of storage heater and is selected according to the model of storage heater installed in the room or space.

The seasonal band may be calculated as follows. Lookup tables may be used to calculate the seasonal band and a seasonal band offset. Referring to FIG. 5, the seasonal band may be set to a value between 1 and 7 ranging from winter months to summer months. The seasonal band may be set according to the maximum rate of change of room temperature in the room or space per hour. The rate of change of room temperature per hour may be measured throughout the day over a time period of two or more hours. The rate of change of room temperature during periods when the storage heater fan is running or the core is charging is not taken into account for calculating the seasonal band. At a predetermined time of the day, for example, 00:00, the maximum rate of change of room temperature from the data collected is selected. For instance, a maximum rate of change of room temperature per hour of between 0 and 0.1 may correspond to a seasonal band of 7 indicating May, June, July or August. That is, in these summer months, there will be relatively little variation in the room temperature in periods when the storage heater is not active. A maximum rate of change of room temperature per hour of −1.5 may correspond to a seasonal band of 1 indicating February.

The seasonal band may be adjusted based on the difference between the setpoint and actual room temperature at the predetermined time at which the algorithm is implemented, for example midnight or 00:00. This is known as the seasonal band offset. The difference is typically the setpoint minus the actual room temperature. The actual room temperature may be measured using a temperature sensor in the room or space where the storage heater is located. The seasonal band adjustment may be effected at the predetermined time of the day, for example at 00:00. This adjustment of the seasonal band constitutes the seasonal band offset.

It will be appreciated that in circumstances where there is insufficient information to allow computation of a seasonal band adjustment, the controller may be configured to use the actual date values available within the system and compute an appropriate seasonal band for that date.

FIG. 6 shows an example of a lookup table used to calculate the seasonal band offset or adjustment. Depending on the difference between the setpoint and actual room temperature, the seasonal band may be adjusted by between −3 and 2. For example, if the difference between the setpoint and actual room temperature is greater than or equal to 3, the seasonal band adjustment may be −3. If the difference between the setpoint and actual room temperature is only 1 however, the seasonal band adjustment may be 0. The minimum seasonal band however may be limited to 1, and the maximum seasonal band may be limited to 7. That is, when the adjustment is taken into account, the lower limit of the seasonal band is 1 and the upper limit of the seasonal band is 7. For example, if the seasonal band was determined to be 2 based on the maximum rate of change of room temperature per hour, and the difference between the setpoint and actual room temperature was measured to be 3 giving a seasonal band adjustment of −3, the seasonal band would be adjusted to a minimum of 1.

The background heat requirement is a function of the remainder of time in the day other than the number of heating hours programmed and the actual standing loss of the storage heater. The actual standing loss refers to the loss of heat to the surroundings when the storage heater is inactive. For example, standing loss may occur during periods when a fan of the storage heater is inactive. The actual standing loss is a function of the seasonal band. FIG. 7 illustrates an example of a lookup table for calculating the actual standing loss. Referring to FIG. 7, the actual standing loss depends on the heater model and the seasonal band. The background heat requirement may be calculated using the following equation:

$$\text{background heat requirement (kWh)} = (24 - \text{number of heating hours programmed}) \times \text{actual standing loss for heater (W)}$$

The daily energy requirement (DER) is a function of both the stored energy requirement and the background heat requirement. The DER may be calculated using the following equation.

$$\text{Daily Energy Requirement (DER) (kWh)} = \text{stored energy requirement (Wh)} + \text{background heat requirement (Wh)}$$

The daily run time (DRT) is a function of the daily energy requirement (DER). The DRT refers to the number of hours the storage heater is required to be charged based on the adaptive control. The DRT hours is calculated according to the formula as follows:

$$\text{Daily Run time (DRT) hours} = (\text{Daily Energy requirement (kWh)} - \text{Residual energy (kWh)})/\text{rated input power of heater (kw)} + \text{Run time adjustment for adaptive offset comfort} + \text{additional extra charge}$$

Figure 9:
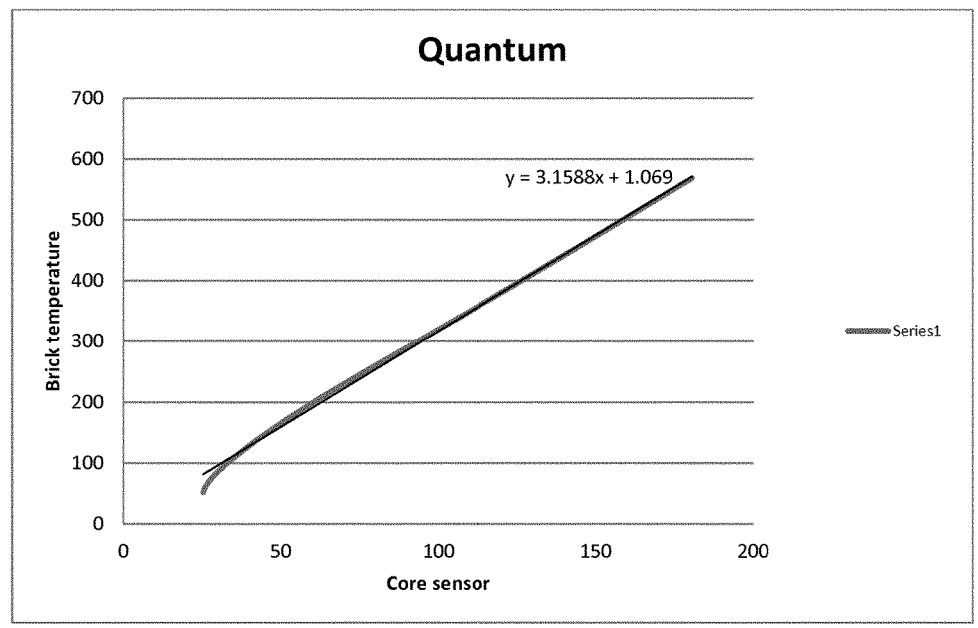
FIG. 9 is a graph showing the relationship between core sensor temperature and brick temperature.

The residual energy may be calculated at the end of the previous day, for instance at the predetermined time at which the algorithm is performed. The residual energy is a function of the core temperature of the storage heater. FIG. 8 is a lookup table showing the relationship between core sensor temperature, brick temperature, and residual energy. FIG. 9 is a graph showing the relationship between core sensor temperature and brick temperature. A sensor associated with the core of the storage heater may indicate a temperature of the heatable material in the form of bricks or other materials such as ceramic which is located within a housing of the storage heater. The core temperature may be read at 00:00 as mentioned above. The residual energy is a function of the temperature of the heatable material. As would be understood by those skilled in the art, the residual energy may also be a function of the mass of the heatable material such as bricks, and the specific heat capacity of the heatable material. Each heater type may have a different heater size in terms of the mass of heatable material.

Figure 10:
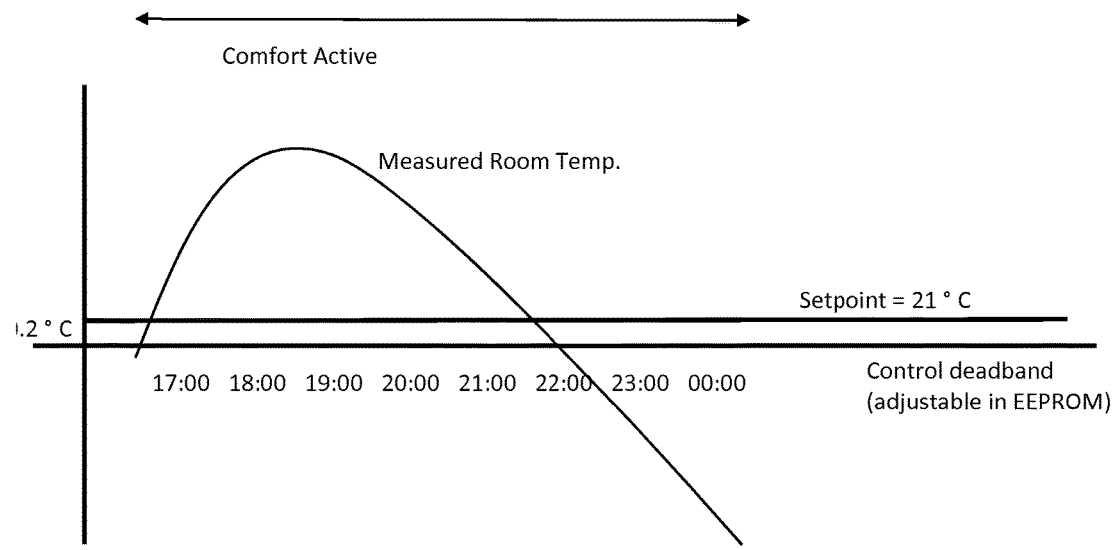
FIG. 10 illustrates an example of calculating the run time adjustment.

Each heater type may have a specific input power rating in Kw, ranging for example between 1.56 and 3.3 KW. The run time adjustment for adaptive offset comfort refers to an additional charge time that can be incorporated in the daily run time (DRT). The run time adjustment may be calculated based on the previous day's history and added to the DRT during the next run time calculation. The run time adjustment for adaptive offset comfort may be calculated as follows and as illustrated in FIG. 10. During evening comfort periods (between 17:00-00:00 for example) for each hour the difference between the measured room temperature (from the sensor) and the setpoint (minus the control deadband) may be calculated. The control deadband may be adjusted in an EEPROM in the heater. In an embodiment, the control deadband may be 0.2° C. The difference is measured only when the measured value is less than the setpoint (minus the control deadband). The difference for each hour is totalled to obtain the hour deficit degree Centigrade (HrC). For every HrC deficit, a charge time may be added. The charge time may be 15 minutes for example per hour. For example, if the HrC deficit is 2.1 HrC, then the run time adjustment may be 2.1×0.25=0.525 hrs. Thus for the next DRT calculation, 0.525 hrs is added to the DRT. In an embodiment, the charge time may be programmable in the EEPROM in the heater.

An example of calculating the run time adjustment is illustrated in FIG. 10. Referring to FIG. 10, during period 17:00 to 00:00 the room temperature was in deficit for 2 hours (22:00-23:00 and 23:00 and 00:00). For period 22:00 to 23:00 the average deficit was (20.8−19.8)*½=0.5 HrC. For period 22:00 to 23:00 the average deficit was (20.8−18.8)*½=1 HrC. Thus, the total deficit was 1.5 HrC. To obtain the run time adjustment, multiply the total deficit by the charge time per HrC. That is, 1.5 HrC×0.25. Accordingly, the run timer adjustment was 0.38 hours, or 22.5 minutes.

In another embodiment, the DRT may be supplemented by an additional extra charge run time set on a user interface of the storage heater. Thus the total DRT may be calculated as follows:

Daily Run time (DRT) hours=(Daily Energy requirement (Kwh)−Residual energy (Kwh))/rated input power of heater (Kw)+Run time adjustment for adaptive offset comfort+additional extra charge The present teaching provides a method for adaptively controlling the charging time of a storage heater for a following time period. The method in the form of a charge time algorithm may be run at a predetermined time every 24 hours. By controlling the charging of a storage heater according to recently determined historical data such as the seasonal band, heating demand, setpoint, number of hours programmed, standing loss of the heater, residual energy in the heater, and other factors, a more accurate charging time may be calculated in order to meet the following day's heating requirements. It will be understood that when a charging time is calculated it is normally applied from the start of the off period, this is often referred to a front charging. Alternatively a back charging process could be implemented whereby the start time is delayed to ensure the calculated charge time ends within the last hour of the available charge period.

Where charging has been discussed with reference to a single charge period typically at night, it will be appreciated that a system and method per the present teaching could provide split charge periods: for example, a night time period plus afternoon and evening periods. The system could also be adapted to allow dynamic charging periods determined for example by the electricity supply company depending on their daily load requirements (e.g. wind forecast, load forecast).

While the above exemplary implementation was described with reference to adaptive control based on actual heater performance, it will be appreciated that the parameters used in the dynamic control used inputs from factors beyond the specifics of the hardware. The daily energy requirement of any one heater may be based on one or more of the following which will typically be implemented in one or more modules which are accessed and processed by the controller:

Adaption Based on Fan Run Time

Where the heater incorporates a fan, the daily energy requirement may be derived from a number of inputs, among them number of programmed hours of heating. These are the periods defined by the user when a chosen comfort temperature is required. It will be appreciated that normal operations will typically require use of a fan to achieve this comfort temperature. The duration of time that the fan runs will affect the heat output of the heater: increasing the time will provide a corresponding increase in the heat output from the heater. However in milder conditions it is possible that the heat from the casing of the heater is sufficient to achieve the comfort conditions for part of the day and the fan does not run as much. It is therefore important that information is sent back to the controller indicating how much fan operation there was during the previous day, giving a prediction of how much it will run the following day. If the controller sees the fan operation reduced significantly it adapts the calculated energy required downwards.

Adaption Based on Boost Element Usage

Many heaters incorporate a boost element to allow a user temporarily increase the heat output of the heater by activation of the boost element. The controller can be configured to monitor the use of the boost element over a period of 2 to 3 days and if there is repeated extensive use of the boost element it will adapt the daily energy requirement to increase the stored energy, reducing the need for boost element heating. There can be a number of reasons for needing to run the boost element such as not setting the heating requirements correctly or heater incorrectly sized for the room. Regardless of the reason, excessive use of the boost element will have a detrimental effect on running costs. The controller with therefore adjust the calculated energy requirement upwards to provide more heating from the energy stored at off peak rate.

Adaption Based on Heating Requirements.

Storage heaters are typically provided with a facility to allow a user control the duration and number of heating periods within which the heater will be active in any one 24 hour period. For example if the user is provided with a facility to activate 4 heating periods, the user will set the heating periods via a user interface, selecting up to 4 heating periods per day. Depending on when these heating periods occur the energy requirement can be quite different. For example heating periods spread evenly throughout the day will different in terms of required energy stored from long heating periods mainly in the evening. A controller per the present teaching can differentiate between different heating profiles and adapt the calculated energy requirement accordingly.

Off Peak Supply Profile

Storage heaters operate typically on a principle of charging the heater during what is termed an "off-peak" period. This is typically during the night when the load on the electricity network is at its lowest and users are incentivised to use this period by different tariff regimes. While the most common off peak supply profile is a seven consecutive hour period during the night, network operators may provide or encounter other profiles. These mainly consist of a shorter night time period with additional period or periods during the day. These "split" profile can be advantageous to both the user and the energy supplier but only if the heater can utilise them effectively. In accordance with the present teaching, the controller may be configured to sense a charging of the heater and to associate the charging with specific times. In this way the controller has the ability to "learn" the off peak supply profile and adapt the energy requirement to suit the profile.

Residual Energy

In order to optimise the heating of any heater the present teaching provides an arrangement whereby the controller monitors the level of stored energy at the end of each day. This energy is termed residual energy. The controller will adapt the calculated energy requirement to maintain the residual energy within an optimum range.

Outside Temperature Profile

In certain configurations a controller provided in accordance with the present teaching can use actual weather conditions to optimise the heating regime of the heater. For example, when provided in a communication mode and linked to a wide area network or other external sensors, the controller can receive real-time weather data and use this to calculate the seasonal band.

It will therefore be appreciated that a controller per the present teaching may use one or more sets of parameters to dynamically modify the heating regime of a storage heater. Where described with reference to any one module, it will be appreciated that aspects and elements of one module can be used in combination with or instead of aspects and elements of another module.

The words comprises/comprising when used in this specification are to specify the presence of stated features, integers, steps or components but does not preclude the presence or addition of one or more other features, integers, steps, components or groups thereof.

Having described the invention, the following is claimed:

1. A storage heater comprising:
   a heatable material that increases in temperature when heated; and
   a controller including a processor for executing a computer program and a memory configured to store a user input number of programmed heating hours, said controller configured to adaptively control a charging time for heating the heatable material by supplying energy thereto, the storage heater having a heating cycle where the heatable material is heated in advance of a distribution of heat from the heatable material,
   wherein the computer program which when executed by the processor is configured to:
     determine a stored energy requirement value of the storage heater by reading from the memory the programmed heating hours and an expected heating demand per hour of the storage heater as obtained from a lookup table based on a storage heater model reference, a seasonal band parameter, an external temperature value and a room temperature setpoint as set by a user, the computer program computing the stored energy requirement by multiplying the programmed heating hours by the expected heating demand;
     determine a background heat requirement value of the storage heater by computing from a lookup table a standing loss value associated with the storage heater and using the standing loss value in conjunction with a time determination of a remainder of time in a day other than the programmed heating hours;
     determine a daily energy requirement (DER) value of the storage heater by a computation based on the stored energy requirement value and the background heat requirement value; and
     determine a daily run time (DRT) at a predetermined time in advance of each heating cycle, the daily run time being a minimum charging time for the storage heater based on the daily energy requirement (DER) value and residual energy in the storage heater.

2. The storage heated of claim 1, wherein the computer program when executing on the processor of the storage heater is configured to compute the daily energy requirement (DER) value from a summation of the stored energy requirement value plus a determined background heat requirement value.

3. The storage heater of claim 2, wherein the computer program when executing on the processor of the storage heater is configured to determine the background heat requirement value using the formula:

background heat requirement (kWh)=(24−number of heating hours programmed)×actual standing loss for heater (W).

4. The storage heater of claim 3, wherein the actual standing loss is provided in a lookup table readable by the computer program, the actual standing loss being a function of a model of the storage heater and a seasonal band.

5. The storage heater of claim 1, wherein the computer program when executing on the processor of the storage heater is configured to compute the daily run time (DRT) using the formula:

Daily Run time (DRT) hours=(Daily Energy requirement (Kwh)−Residual energy (Kwh))/rated input power of heater (Kw)+Run time adjustment for adaptive offset comfort+additional extra charge run time set on UI.

6. The storage heater of claim 5, wherein the computer program is configured at a predetermined time to calculate a run time adjustment using a difference between the measured room temperature and a setpoint temperature.

7. The storage heater of claim 6, wherein the run time adjustment is calculated by multiplying a charge time by the difference between the measured room temperature as determined by a temperature sensor of the storage heater and the setpoint temperature.

8. The storage heater of claim 7, further comprising an EEPROM, the EEPROM having a stored charge time, the computer program being configured to enable an adjustment of the stored charge time.

9. The storage heater of claim 7, wherein the charge time is 15 minutes.

10. The storage heater of claim 4, wherein the seasonal band is set to a value between 1 and 7 respectively corresponding to a range from winter months to summer months, the controller being configured to use the actual date values available within the system and compute an appropriate seasonal band for that date.

11. The storage heater of claim 10, wherein the seasonal band is set according to a maximum rate of change of room temperature per hour.

12. The storage heater of claim 11, wherein the controller is configured to log room temperature measurement over a time period of two or more hours and to select a maximum rate of change of room temperature per hour at a predetermined time from the logged temperature measurement.

13. The storage heater of claim 11, wherein a maximum rate of change of room temperature per hour of 0 corresponds to a seasonal band of 7.

14. The storage heated of claim 11, wherein a maximum rate of change of room temperature per hour of −1.5 corresponds to a seasonal band of 1.

15. The storage heated of claim 12, wherein the controller is configured to adjust the seasonal band according to a computed difference between a room temperature setpoint set by a user and the actual room temperature measured at a predetermined time using a temperature sensor of the storage heater.

16. The storage heater of claim 1, wherein the computer program is configured to use one or more of the following to adapt daily energy requirements of the storage heater:
   Adaption based on fan run time;
   Adaption based on actual heater performance;
   Adaption based on boost element usage;
   Adaption based on heating requirements;
   Off Peak supply profile;
   Residual Energy; and
   Outside Temperature Profile.

* * * * *